INVENTOR.
ALEXANDER WOLF

Feb. 6, 1951     A. WOLF     2,540,310
INTEGRATION DEVICE FOR RADIOACTIVITY MEASUREMENTS
Filed Aug. 12, 1947     2 Sheets-Sheet 2
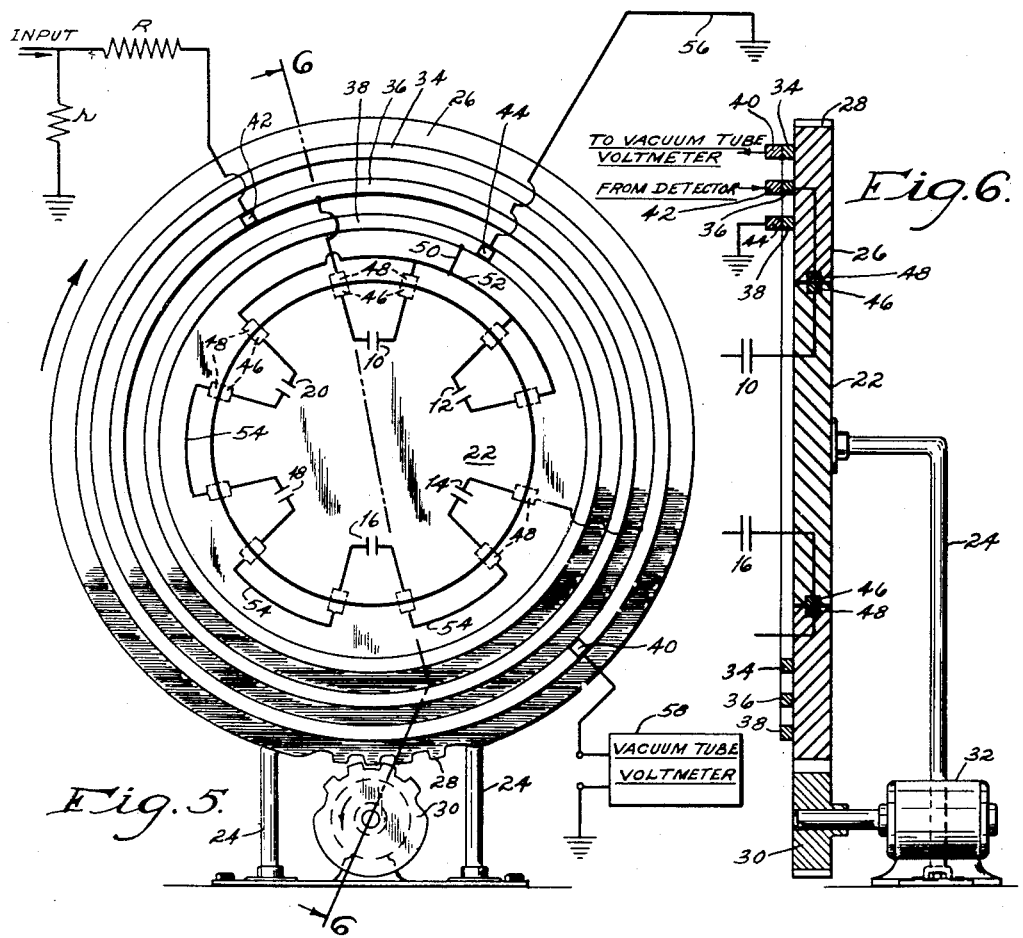
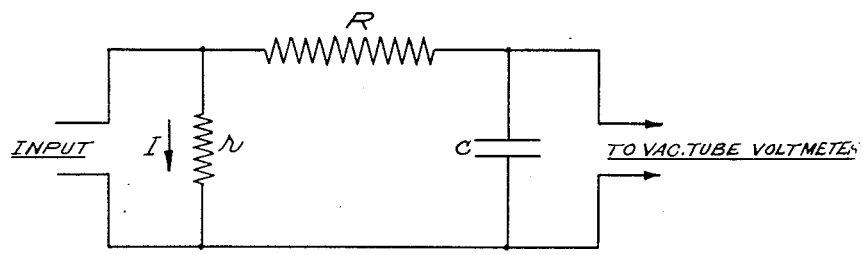
INVENTOR.
ALEXANDER WOLF
BY
ATTORNEYS Patented Feb. 6, 1951

2,540,310

UNITED STATES PATENT OFFICE 2,540,310

INTEGRATION DEVICE FOR RADIOACTIVITY MEASUREMENTS

Alexander Wolf, Houston, Tex., assignor to The Texas Company, New York, N. Y., a corporation of Delaware Application August 12, 1947, Serial No. 768,029

6 Claims. (Cl. 171—95)

This invention relates to integration circuits and more particularly to an integration circuit or device useful in the measuring of the intensity of radioactivity. The principal object of the invention is the provision of a method and an apparatus by means of which accurate radioactivity intensity measurements may be made much more quickly than with the more or less conventional integration circuit consisting of a resistor and a single condenser.

The sensitivity of the instruments commonly employed in the detection and measurement of the emissions associated with nuclear transformations is such that the statistical nature of physical processes becomes very apparent. As a result of the relatively small number of particles or quanta which are detected, it is impossible to state the intensity of the emission at any particular instant, but only the average intensity over a definite time interval. The precision of a measurement increases with this time interval and also with the intensity. In laboratory measurements, whenever instruments are employed which detect individual particles or quanta, it is common practice either to measure the time during which a definite number of events is detected, or to count the number of events during a definite time interval. Such measurements are carried out with a stop watch and some type of counting device.

If it is desired to record graphically the intensity of an emission as a function of time, it is necessary to introduce what is known as an "integration device," the function of which is to provide some quantity proportional to the time average of the number of events which are detected. The time interval over which the average is taken may be called the "time constant" of the device.

In accordance with this invention an "ideal" integration device, the characteristics of which will be discussed hereinafter, is approximated very closely by means of a ring of identical condensers, perhaps six in number, arranged so that the pulses from a radiation detector are passed through a resistance to one condenser for a time period which is short compared to the product of the resistance of the resistor and the capacitance of that condenser, and then periodically and regularly to each of the other uncharged condensers. The accumulated voltage of a group of the so charged condensers is measured and these operations are repeated continuously by removing and discharging one of the charged condensers from the group while simultaneously adding to the group a newly charged condenser.

For a better understanding of the invention reference may be had to the accompanying drawing in which:

Figure 5 is a somewhat diagrammatic front elevation of a six condenser integration device;

Figure 6 is a sectional view, also somewhat diagrammatic, taken on the line 6—6 of Figure 5; and Figure 7 is a diagram of a more or less conventional integration circuit.

Figure 1:
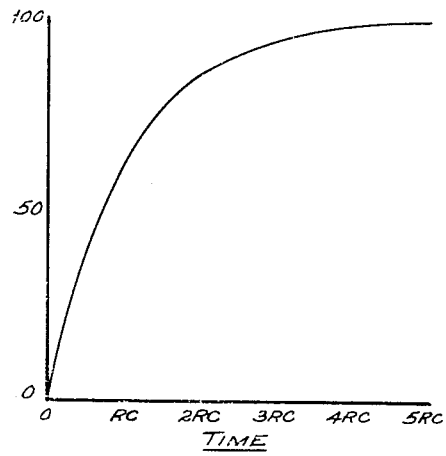
Figure 1 is a curve showing the charge on a condenser when a sudden change occurs in the intensity of the emission being measured.

The integration device most commonly employed consists of a resistor R and a condenser C (Fig. 7) connected across a comparatively small resistor $r$. If a series of current pulses I is permitted to flow as indicated, then at any time a charge exists on condenser C, which is proportional to a weighted time average of the frequency of the current pulses. The time over which this average is taken depends only on the product $R \times C$. The larger this product the smaller the statistical fluctuations in the charge on condenser C. The statistical fluctuations can be suppressed to any desired extent by making this product large enough, but only at the expense of response speed. Figure 1 shows what happens to the charge on condenser C when a sudden change occurs in the intensity of the emission which is being measured. Along the ordinate of Figure 1 is plotted the charge on condenser C in percentage of the final charge. The abscissa represents time, plotted in terms of the product $R \times C$. This can be done because dimensionally the product of resistance and capacitance is time. In particular, if the resistance is measured in megohms and the capacitance in microfarads then the product comes out as seconds of time. It can be seen from Figure 1 that the charge on a condenser, the quantity which is ultimately recorded, increases sharply at first, and then very gradually. In particular, if one desires to measure the final charge with an accuracy slightly better than 2 percent, one must wait a time interval of 4RC before a reading is taken. It is this time delay which practically limits one in the suppression of the statistical fluctuations.

Figure 2:
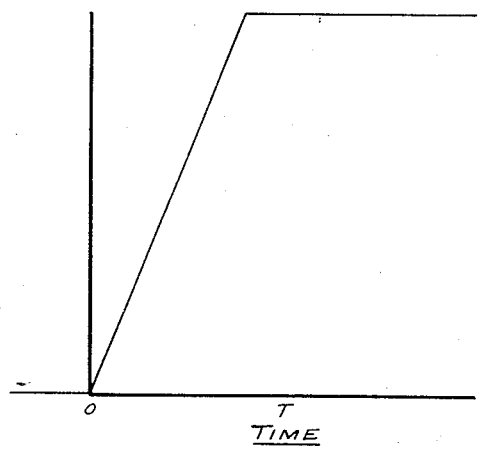
Figure 2 is a somewhat similar curve for an "ideal" integration device.

The above described integration device, while exceedingly simple, is not necessarily the best. One can define an "ideal" integration device as one which at any time provides a reading or deflection which is proportional to the number of particles or quanta observed during a definite interval just preceding the instant at which a recording is being made. The response of such a device to a sudden change in intensity is shown in Fig. 2. Such a device will deflect at a uniform rate and will reach the final reading in a definite time T, which can be called the "time constant" of the device. This can be compared with the asymptotic approach to the final reading of the resistance-condenser network (Fig. 1).

Figure 3:
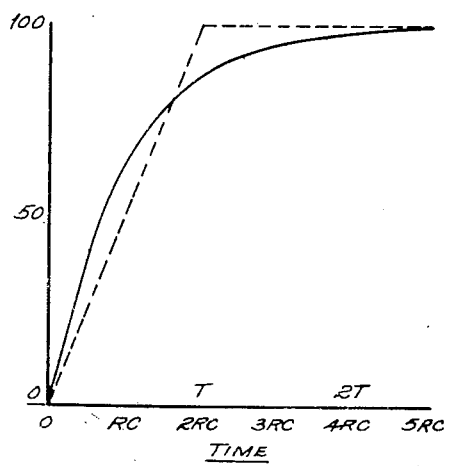
Figure 3 shows the curves of Figures 1 and 2 superimposed upon each other.

Theoretical considerations indicate that the time constant T of the "ideal" integration device must be made equal to twice the product $R \times C$ of the resistance-condenser network in order to satisfy the requirement that the statistical fluctuations which will be recorded by the former device will not exceed the statistical fluctuations of the latter. One thus arrives at a direct comparison of the two types of devices, adjusted for the same statistical fluctuations. Figure 3 shows the response curves of the two devices superimposed on each other. It can be seen that whereas the "ideal" device reaches its final reading at the time T, the comparable resistance-condenser network at that time is still 13½ percent away from the final reading. A time 2T is required until the latter comes within 1.8 percent of the final reading, which might be considered the practical limit of accuracy in this type of measurement. Thus the "ideal" device offers an advantage of a factor of 2 in the speed of response whenever a semi-precise measurement is to be made, and is never inferior if a measurement is required with an accuracy better than 20%.

In Figures 5 and 6 of the drawing there is illustrated an integration device embodying the principles of this invention. A plurality of electrical condensers 10, 12, 14, 16, 18 and 20 of equal capacities are mounted in any suitable manner on a disc or plate 22, preferably formed of electrically insulating material and supported rigidly as by means of brackets 24. Disposed around the periphery of the disc 22 is an angular ring member 26, the inner edge of which fits closely about the outer edge or rim of the disc 22. The outer edge of the ring member 26 is provided with gear teeth 28 adapted to cooperate with similar teeth on a pinion 30 mounted upon the shaft of a motor 32. The motor 32 is adapted by any suitable means to rotate the ring 26 at intervals in a clockwise direction through angles of 60° for a purpose which will be pointed out hereinafter.

To one face of the ring 26 three metallic rings 34, 36 and 38 are secured and disposed so as to maintain electrical contact with these three rings are three wiping brushes 40, 42, and 44 respectively. Although these brushes are shown in vertical alignment in Figure 6 they are, for ease of illustration, shown at different angular positions in Figure 5.

From each of the six condensers 10—20 lead wires extend to contacts 46 imbedded in the outer rim of the stationary disc 22. For each pair of condenser contacts 46 a pair of brush contacts 48 are provided in the inner edge of the ring 26 in such a manner that for each stationary position of the ring 26 a pair of the brush contacts 48 will be in alignment and in contact with a pair of the condenser contacts 46 as is shown in Figure 5. One of the brush contacts 48 is connected electrically with the ring 36; one of the brush contacts 48 opposite condenser 14 is connected to the ring 34 while the inner ring 38 is connected by wires 50 and 52 to the two brush contacts opposite condenser 12, to the other one of the brush contacts opposite condenser 10 and to one brush contact opposite condenser 20. Condensers 14, 16, 18 and 20 are connected in series by means of the condenser contacts 46, brush contacts 48 and wires 54. The inner ring 38 is connected through the brush contact 44 to ground at 56. The outer ring 34 is connected through brush 40 to a high impedance vacuum tube voltmeter 58 while the middle ring 36 is connected through brush 42 with the input circuit shown as comprising the series resistance R and the smaller grounded resistance r. It is understood that the current pulses passing through the input circuit may be from a radiation detector or counter, not shown.

Figure 4:
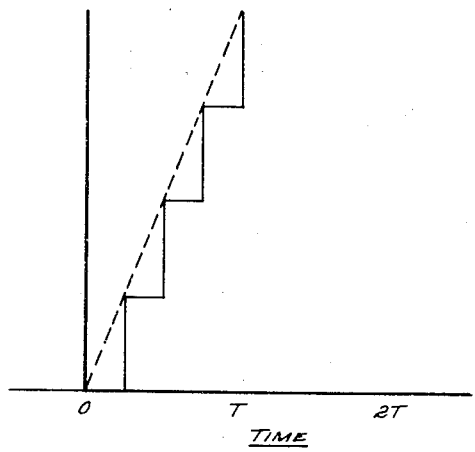
Figure 4 is a curve showing the charge on a plurality of condensers arranged in accordance with the invention.

With the elements in the position shown in Figure 5 condenser 12 is short circuited, condenser 10 is connected to the charging or input circuit which circuit is operated substantially like the conventional resistance-condenser integrating network. Condensers 14, 16, 18 and 20 are in series with the high impedance vacuum tube voltmeter 58. Assuming that at the start of the operation there is no charge on any of the condensers, the voltmeter 58 will indicate zero. For a period of time ¼T, where T is the time constant of the device, a charge is allowed to accumulate on the condenser 10. The product of the series resistance R and the capacitance of the condenser 10 is not less than ½T, and preferably T, ensuring that the charge on the condenser 10 increases uniformly with time as can be seen by reference to Figure 1. After the time interval ¼T has elapsed the ring 26 is turned rapidly clockwise through 60° by means of the motor drive 32—30 whereupon condenser 12 is substituted for condenser 10 in the charging circuit with condenser 10 being connected into the array of four condensers in series to which the measuring device 58 is connected. The voltage indicated by the measuring device 58 will then become ¼ of the final voltage (see Figure 4). After another interval of ¼T the ring 26 is rotated and advanced again in a similar fashion and after four 60° turns of the rings, all four condensers then connected to the measuring device 58 will be fully charged.

There is no charge thereafter unless the charging rate changes, either because of statistical fluctuations, or because of an alteration in the radiation which is being measured. If the intensity of the radiation being measured changes between the switching operations five rotational steps may be required before the final reading is obtained instead of the four which were described. The measuring circuit must be of such high input impedance that it does not permit any appreciable discharge of the condensers during the measuring cycle T.

As has been previously mentioned the device shown in Figures 5 and 6 is by way of example only and may take any other suitable form so long as the principles described are carried out. For instance, the ring member 26 may be maintained in a fixed position and the inner plate 22 caused to rotate at intervals with respect thereto. In such a case and with the connections as shown in Figure 5 the inner plate would rotate in a counter-clockwise direction.

Because of the increase in the speed of response when using an integration device such as is described in the foregoing paragraphs such a device has many applications such, for example, as in radioactive well logging wherein a radiation detector with its integration circuit is passed through a bore hole or a well to measure variations in the radioactivity of the formations traversed. With the integration device or circuit described above such a log can be made in considerably less time than when the conventional integration circuit comprising a series resistance and one condenser is used. As another example, measurements of the thickness of a wall or plate by radioactivity, as described in the reissue patent to D. G. C. Hare, No. 22,531, granted August 22, 1944, can be made much more quickly than heretofore.

Obviously many other modifications and variations of the invention, as hereinbefore set forth, may be made without departing from the spirit and scope thereof, and therefore only such limitations should be imposed as are indicated in the appended claims.

I claim:

1. The method of measuring the rate of current pulses which consists in passing these pulses through a resistor to a condenser for a time period, periodically and regularly repeating this step on other uncharged condensers, measuring the accumulated voltage of a group of such condensers which have been charged, and repeating these operations continuously by removing and discharging one condenser from the group, subjecting that condenser to a new charge by said pulses and adding it to the group of charged condensers, the time for charging each condenser being the same fraction of the time constant of said resistor and any one of said condensers as one is to the number of condensers in said group.

2. The method of measuring the rate of current pulses which consists in passing these pulses through a resistor to charge a condenser for a time period, periodically and regularly repeating this step on other uncharged condensers, measuring the accumulated voltage of a group of such condensers which have been charged, and removing and discharging one condenser from the group simultaneously with the addition of a newly charged condenser to the group, the time for charging each condenser being the same fraction of the time constant of said resistor and any one of said condensers as one is to the number of condensers in said group.

3. The method of measuring the rate of current pulses which consists in passing these pulses through a resistor to a condenser for a time period, periodically and regularly repeating this step on other uncharged condensers, measuring the accumulated voltage across a group of condensers which have been so charged, at regular intervals adding to said group a newly charged condenser while simultaneously removing from the group one of the previously charged condensers, and discharging said removed condenser while a new condenser is being charged by said pulses preparatory to being added to the group, the time for charging each condenser being the same fraction of the time constant of said resistor and any one of said condensers as one is to the number of condensers in said group.

4. An integration circuit comprising a resistor, a group of condensers of equal capacities, the resistor when in series with any one of the condensers forming an integration circuit having a time constant, means for charging one of said condensers through said resistor for a time period, means for removing said charged condenser from the charging portion of the circuit and replacing it with an uncharged condenser, means for simultaneously connecting the charged condenser in series with the previously charged condensers to form a group, said time period being equivalent to the same fraction of said time constant as one is to the number of condensers in said group, means for removing one of the condensers from said group and for simultaneously discharging said removed condenser, whereupon a voltage will be built up across the group of condensers connected in series during the said charging time, and a driving device for actuating all of said means in repeated sequence whereby the averaging effect of the integration circuit is extended over a time period which is several times as long as said charging time.

5. A circuit for measuring the rate of current pulses, comprising a resistor, a plurality of condensers of equal capacities, the product of the capacity of one of said condensers times the resistance of said resistor defining the time constant of the circuit, means for connecting one of said condensers in series with said resistance so that a charge will be built up thereon from the output of said detector for a time period, means for short circuiting another of said condensers to remove any charge thereon, a voltage measuring instrument, means for connecting the remaining condensers in series with said instrument to form a group, said time period being equivalent to the same fraction of said time constant as one is to the number of condensers in said group, and means for advancing said condenser connecting means at regular intervals so that one of the condensers which had been connected to said instrument will be short-circuited and discharged, the condenser which had been previously short-circuited will be connected in series with said resistor to be recharged and the condenser on which a charge had previously been built up will be connected in series with those still connected to said instrument.

6. A circuit for measuring the rate of current pulses, comprising a resistor, a plurality of condensers of equal capacities, the product of capacity of one of said condensers times the resistance of said resistor defining the time constant of the circuit, means for connecting one of said condensers in series with said resistance so that a charge will be built up thereon from the output of said detector for a time period, means for short-circuiting another of said condensers to remove any charge thereon, a voltage measuring instrument, means for connecting the remaining condensers in series with said instrument to form a group, said time period being equivalent to the same fraction of said time constant as one is to the number of condensers in said group, and means for advancing said condenser connecting means at regular intervals so that one of the condensers which had been connected to said instrument will be short-circuited and discharged, the condenser which had previously been short-circuited will be connected in series with said resistor to be recharged and the condenser on which a charge had previously been built up will be connected in series with those still connected to said instrument, the length of said interval being in the same proportion to the length of said time constant as one is to the number of condensers at any one time connected in series to said instrument.

ALEXANDER WOLF.

REFERENCES CITED

The following references are of record in the file of this patent:

UNITED STATES PATENTS

| Number | Name | Date |
|---|---|---|
| 1,508,162 | Chubb | Sept. 9, 1924 |
| 2,110,015 | Fitzgerald | Mar. 1, 1938 |
| 2,260,933 | Cooper | Oct. 28, 1941 |
| 2,349,437 | Keeler | May 23, 1944 |
| 2,373,247 | Jones | Apr. 10, 1945 |
| 2,377,757 | Clark | June 5, 1945 |
| 2,411,573 | Holst | Nov. 26, 1946 |
| 2,434,297 | Test et al. | Jan. 13, 1948 |

OTHER REFERENCES

Curtiss-Research Paper R. P. 1223, Journal of Research of the National Bureau of Standards, vol. 23, July 1939.